88-1

SR 163,760 CROSS REFERENCE SEARCH ROOM

T 4302 2T

Dec. 29, 1964 E. S. BRUMFIELD ETAL 3,163,760

REFRACTIVE OPTICS INFRARED SCANNING SYSTEM

Filed Dec. 28, 1961 4 Sheets-Sheet 1 X25

INVENTORS.
ELVIN S. BRUMFIELD
MICHAEL F. BRAUN
BY George C. Sullivan
Agent

3163760
OR IN 250/347

REFRACTIVE OPTICS INFRARED SCANNING SYSTEM

*INVENTORS.*
ELVIN S. BRUMFIELD
MICHAEL F. BRAUN
BY George C. Sullivan
Agent

REFRACTIVE OPTICS INFRARED SCANNING SYSTEM

Filed Dec. 28, 1961 4 Sheets-Sheet 3

INVENTORS.
ELVIN S. BRUMFIELD
MICHAEL F. BRAUN
BY George C. Sullivan
Agent

REFRACTIVE OPTICS INFRARED SCANNING SYSTEM

Filed Dec. 28, 1961 4 Sheets-Sheet 4

*INVENTORS.*
ELVIN S. BRUMFIELD
MICHAEL F. BRAUN
BY George C. Sullivan
Agent

United States Patent Office 3,163,760
Patented Dec. 29, 1964

3,163,760

REFRACTIVE OPTICS INFRARED SCANNING SYSTEM

Elvin S. Brumfield, Temple City, Calif., and Michael F. Braun, Burlington, Iowa, assignors to Lockheed Aircraft Corporation, Burbank, Calif.

Filed Dec. 28, 1961, Ser. No. 162,810
11 Claims. (Cl. 250—83.3)

This invention relates to infrared scanning systems in general and more particularly to a rotatable infrared scanning system employing refractive optics and a variable aperture field stop to vary apparent cell size.

Several different types of infrared scanners are in use at the present time, however, prior to the present invention all infrared scanning systems have exhibited certain shortcomings when utilized in infrared mapping applications. For instance, good detectivity is essential in infrared mapping techniques and most detectors at the present time are severely limited in this respect by infrared radiation noise radiating from the background within the detector field of view. Additionally, most scanning systems in use at the present time employ reflective type optical systems which are extremely difficult to shield from extraneous energy. Moreover, most present day infrared scanning systems employ cell noise limited detectors which makes the detectivity of the detector a function of the focal length and diameter of the associated optical system as well as the background field of view of the cell rather than merely a function of the background field of view of the cell.

However, even when background noise limited systems are utilized, several problems are presented. For instance, most background limited detectors employ a cold aperture plate or field stop in front of the infrared cell. Since this plate is cooled at the same temperature as the cell itself, the plate emits a negligible amount of radiation and the background radiation received by the cell is limited by the hole in aperture plate, not by the detector size itself. Thus, the hole in the aperture plate becomes the apparent cell size, and the area of this hole determines the effective cell area. Since this cold aperture plate is normally contained within the Dewar flask, it is extremely difficult to vary. Thus, in these prior art infrared scanners, the hole size is fixed thereby, providing a fixed instantaneous field of view which obviously is not desirable in certain applications such as infrared mapping where aircraft velocity and altitude are continuously varying.

While, as is taught in co-pending patent application, Serial No. 161,202, operation of an infrared mapping system within the range of radiation frequencies from 8.5 to 13 microns is optimum from the standpoint of detecting the self-emission of objects of interest independent of diurnal variations, no known system operates in this spectral region. Lack of suitable components and techniques have heretofore prevented the development of such a system.

It is therefore an object of this invention to provide an infrared detector, the field of view of which is effectively limited to the solid angle subtended at the detector by the entrance window of the instrument.

Another object of the present invention is to provide a novel infrared scanning system employing refractive type optics.

Another object of the present invention is to provide an infrared scanning system employing a background noise limited detector.

Another object of the present invention is to provide a novel infrared scanning system having a variable aperture field stop.

Another object of the present invention is to provide an infrared scanning system which is ideally suited for operation in the 8.5 to 13 micron region.

Other and further objects and advantages of the present invention will become apparent to those skilled in the art from a consideration of the following detailed description when read in light of the accompanying drawings, in which.

Figure 1:
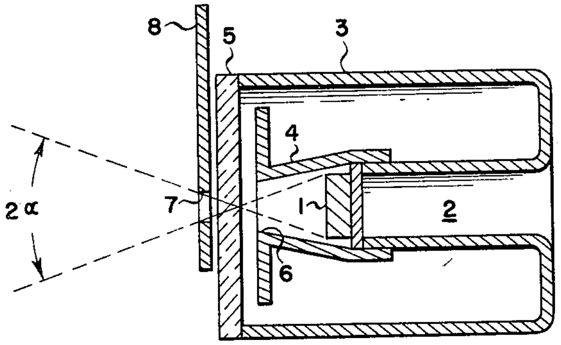
FIGURE 1 is a cutaway side view of the detector assembly of the subject invention which is illustrative of the operation of the variable aperture to determine apparent cell size.

The sensitivity of an infrared reconnaissance system in terms of the flight parameters is derived in vol. 4, No. 4, October 1959, Preceedings of IRIS, for cell noise limited systems.

The alternate derivation for sensitivity of a background noise limited system yields:

$$_{\Delta}Tn=\left[\frac{1}{D_\delta} f/NO\ C \sin\alpha\right]\left[\left(\frac{N_{sc}}{\delta}\right)^{1/2}\left(\frac{K\theta}{2}\right)^{1/2}\right]\frac{1}{D^*_{2\pi} ne\sigma T^3} \quad (1)$$

while sensitivity of a cell noise limited system is given in the above reference as:

$$(2)\quad _{\Delta}Tn\left[\frac{1}{D_\delta} f/NO\right]\left[\left(\frac{N_{sc}}{\delta}\right)^{1/2}\left(\frac{KO}{2}\right)^{1/2}\right]\frac{1}{D^*_{2\pi} ne\sigma T^3}$$

wherein both Equations 1 and 2

$_{\Delta}Tn$=minimum detectable temperature difference
$D$=diameter of optical system
$\delta$=instantaneous field of view
$f/NO$=focal length of optical system/$D$
$C$=is a constant relating to background shielding efficiency
$\alpha$=the half angle of the detector field of view
$N_{sc}$=number of scans per second
$K$=reciprocal of scanning efficiency
$\theta$=total scan angle
$e$=emissivity
$D^*_{2\pi}$=detectivity of a 1 cm.$^2$ cell in its effective spectral region
$n$=the fraction of the total energy emitted from the source which arrives at the detector and lies within its effective spectral region
$\sigma=5.67\times10^{-12}$ watts/cm.$^2$ deg.$^4$
$t$=temperature in degrees Kelvin The first factor in both equations represents the actual aperture size and detector variable parameters, the second factor represents band-pass considerations, and the third factor represents sensitivity and spectral response of the detector.

For the purpose of this invention, the significant factor is the first factor, i.e., actual aperture size, and detector variable parameters. In Equation 2, it can be seen that $_{\Delta}Tn$ increases as the $f/NO$ of the optical system. Thus, to optimize cell noise limited infrared systems, effective $f/NO$ of $f/0.7$ or less must and can be obtained by use of field lenses or cone condensors. However, since the entrance aperture of reconnaissance systems is rarely more than 4.5 inches (a limit imposed by the requirement for high-speed rotating optics) an effective speed of $f/0.7$ means an effective focal length of 3.15 inches, or for a one milliradian field of view, a detector size of .00315 inch is required. Since the smallest detector crystal available is .020 inch square, the first factor of Equation 2 cannot be readily implemented. The normal compromise is to design a system optimized for a larger field of view (in this hypothetical case, the optimum field of view size would be 6.2 mils). Optimizing the system for a larger field of view, however, results in greatly increased detector noise at smaller fields of view which in turn results in a higher $_{\Delta}Tn$.

Detectors operating in the 8.5 to 13 microns wavelength region are background rather than noise limited and thus $_{\Delta}Tn$ is a function of $f/NO\ C \sin \alpha$ as per the first factor of Equation 1. The $f/NO=F/D=1/2 \text{ TAN } \alpha$ where $\alpha$ is equal to the half angle of the detector field of view, or the acceptance angle of the optical system. Thus, the factor $f/NO\ C \sin \alpha$ becomes $\sin \alpha/2 \text{ TAN } \alpha$ which by inspection is shown to be the equivalent of a system employing an $f/NO$ of $f/0.5$ or better.

Thus, two important new design freedoms are available for a background rather than a cell noise limited mode of operation. Firstly, $_{\Delta}Tn$ is a function of the background field of view of the cell only, and is wholly independent of the $f/NO$ of the optical system. Therefore, a slow speed, long focal length optical system may be employed. Ssecondly, the instantaneous field of view can be continuously varied as a function of aircraft velocity over aircraft height and an optimum $_{\Delta}Tn$ can be secured without the necessity of changing detector cell sizes as is required for cell noise limited system.

Referring first to FIGURE 1, which will illustrate the technique that is used to provide an aperture plate with an opening which acts as the apparent cell size. In FIGURE 1 is shown an assembly comprising a large detector crystal 1 in thermal contact with a cold chamber 2 in an evacuated Dewar flask 3. Around this detector crystal 1 and in thermal contact with the cold chamber 2 is a cold shield 4 which extends forward toward the entrance window 5. The cold shield 4 has an entrance hole 6 which is large enough to admit radiant energy from the largest instantaneous field of view required and is flanged outward adjacent the entrance hole 6. It is made of a high absorbing material so that only a negligible amount of radiation will be reflected off of it onto the detector 1.

Normally, there is a cold aperture plate placed in front of the detector 1 which is cooled to the same temperature as the detector. Thus, the cooled aperture plate emits a negligible amount of radiation and the background radiation received by the detector is limited by the hole in the aperture plate, not by the detector size itself. The hole in the aperture plate becomes the apparent cell size, and the area of this hole determines the effective cell area.

The present system provides a technique which permits the hole size 7 (the effective cell size) of the variable aperture plate 8 to be varied outside of the Dewar flask 3. Thus, in accordance with the present invention the entrance window 5 of the Dewar 3 is placed immediately in front of the cold shield 4 with a vacuum space between the two. This window 5 is selected to have a high transmission and hence negligible emission in the effective wavelength regions of the detector 1. A variable aperture plate 8 is placed immediately in front of the entrance window 5. The aperture plate 8 has a gold coating on the side adjacent the Dewar 3 and thus has a high reflectivity and low emissivity on that side. The cold shield 4 is designed to intercept all radiation which can be drawn from the detector 1 and reflected off of the aperture plate 8. Thus, no radiation can reach the detector 1, except that which passes through the aperture 7 over the angle $2\alpha$. By this means, the effective area of the detector 1 is the area of the aperture 7 which is located outside of the Dewar flask 3 and this area can be easily varied as a function of aircraft velocity over aircraft height to obtain optimum angular resolution and the smallest possible temperature detectivity for any given altitude and speed.

As previously discussed, the detector 1, which has its peak sensitivity in the 8.5 to 13 micron region, is desirable. There has been a continuing effort to develop a detector with a long wavelength threshold at 14 microns. The most common detector which approaches these characteristics is copper doped germanium. The disadvantage of this type of detector is that its wavelength threshold is at 30 microns which is much longer than is required. Thus, the cooling requirements of such a detector are quite stringent since liquid helium cooling to a temperature of 4.2° K. must be used.

Mercury doped germanium detectors have recently been perfected which can be easily and reproducibly manufactured and which additionally have a wavelength threshold at 14 microns. They require cooling only to 35° K. While the scanning system as herein presented is capable of using a wide range of dectors, including indium antimonide cooled to liquid nitrogen temperature, and germanium cooled to liquid helium temperature, it has been found that the best detector available at the present time is the mercury-doped germanium type.

Figure 2:
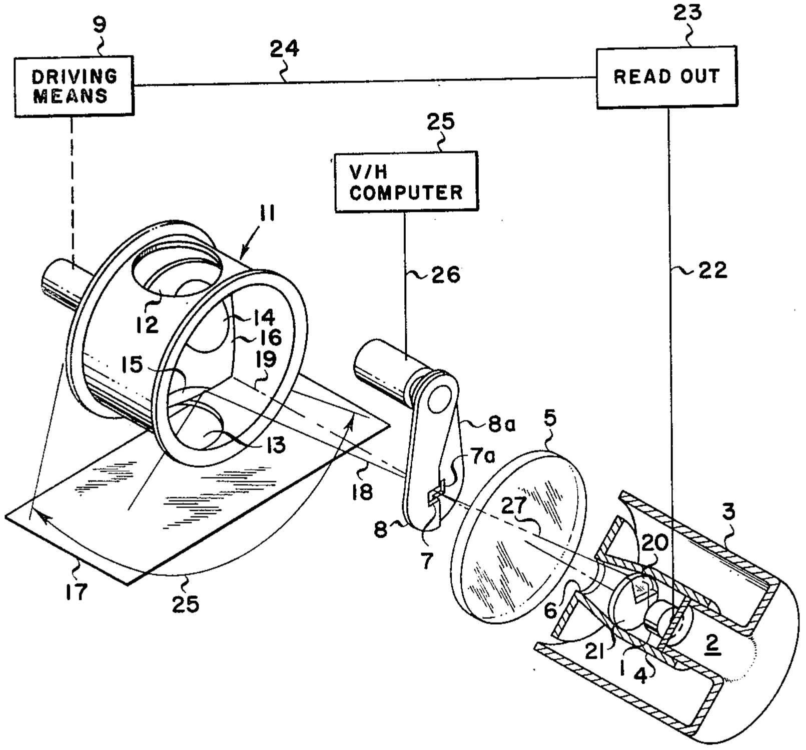
FIGURE 2 is a partially cutaway isometric view of the infrared scanner system of the present invention.

Refer next to FIGURE 2 which is a complete isometric partially cutaway view of the subject novel infrared scanning system. In FIGURE 2 is shown a driving means 9 in driving association with a shaft means 10. Suitable bearing means as well as suitable gearing means to enable driving means 9 to drive shaft 10 are also necessary, but are not shown. Mounted upon shaft means 10 is a lens-mirror system 11 comprising two objective scanning lenses 12 and 13 which, for convenience in packaging, are integrated with faces 14 and 15, respectively, of the folding mirror 16. By this means, the cone of energy from the objective lens which is in optical association with the aircraft instrument window 17 is folded along an axis 18 converging to meet the projected axis of mechanical rotation 19 at the variable aperture field stop 8. The variable aperture field stop actually has two apertures. The first aperture 7*a*, which is in plate 8*a*, is just large enough to accommodate the largest instantaneous view required while the variable aperture 7, which is adjacent the Dewar window 5, is variable from the largest to the smallest instantaneous field of view. Thus, at any instant, a typical ray from the objective lens 13 is directed by the mirror 15 through the adjustable field stop aperture 7 into the Dewar 3. Energy passing through the adjustable aperture 7 passes through the entrance window 5 and the front opening 6 of the cold shield 4. The energy then passes through the opaque portion 20 of a cold field lens 21 onto the detector 1. The optics of the adjustable field stop 8 and the cold field lens 21 will be more fully described hereinafter.

The detector 1 which furnishes a weak electrical signal responsive to radiation lying within its field of view is electrically connected along line 22 to readout means 23. The readout means 23 is in turn electrically connected to drive means 9. The type of readout means employed is not important for the purpose of the present invention. "Readout" is intended to be general to any type of associated equipment capable of utilizing the electrical signal produced by the cell 1.

In operation, the driving means 9 causes shaft 10 to rotate which thereby causes the folding mirror objective lens unit 11 to rotate. Radiant energy is received through window 17 which is in the bottom of the aircraft or instrument pad. The readout system 23 is connected to the driving means 9 which receives an indication of the relative position of the objective lens and prism system. This readout system also receives an electrical signal along line 22 from detector 1 which is indicative of the radiation pattern of the terrain immediately below the aircraft. An ideal system for utilization herewith, as previously stated, is completely set forth in my above mentioned co-pending patent application.

The adjustable field stop aperture 7 which is variable is varied in response to commands received from a *V/H* computer 25 which in turn receives commands from the aircraft velocity and height sensors.

Assume that the reconnaissance system is designed to have a variable field of view from .5 to 18.5 milliradians. The insertion of a properly designed field stop 8 to prevent extraneous radiation from striking the detector 1 and the location of the objective lenses 4 and 5 so that one lens is out of the scan field while the other is scanning is imperative.

It is a common belief at the present time that reflective objects are the most satisfactory for incorporation into infrared reconnaissance systems since large apertures are readily available and chromatic aberrations can be eliminated completely.

However, in a system which incorporates an 18.75 milliradians instantaneous field of view for low altitude high speed mapping in conjunction with a 4.5 inch diameter optical system, a 4.5 inch *f*/2 parabolic mirror is necessary. However, a 4.5 inch *f*/2 parabolic mirror has a blur circle of approximately 2 milliradians at the edge of an 18.75 milliradian field of view while a single element refractive lens of germanium has a blur circle of less than 0.25 mil over this field of view.

Refractive elements mounted on the periphery of the scanning element permit wide angle scanning with one lens 12 and 13 out of the scanned field 25 (FIGURE 2) while the other is scanning. Long focal lengths may also be secured so that large linear displacements due to positioning, bearing losses, and vibrations result in only negligible angular changes, giving more flexibility in production units.

Moreover, reflecting optics become a fairly unattractive solution because of the difficulty in obtaining proper extraneous energy shielding when they are used. Thus, reflective optics which permit the easy utilization of cooled optical stops to reduce the amount of the extraneous radiation striking the detector are superior. Experiments have demonstrated that adequate minimum temperature difference detectivity can be achieved in the present system with the relatively small apertures required by refractive optics. Thus, a refractive optical system is the logical choice for this application.

Figure 3:
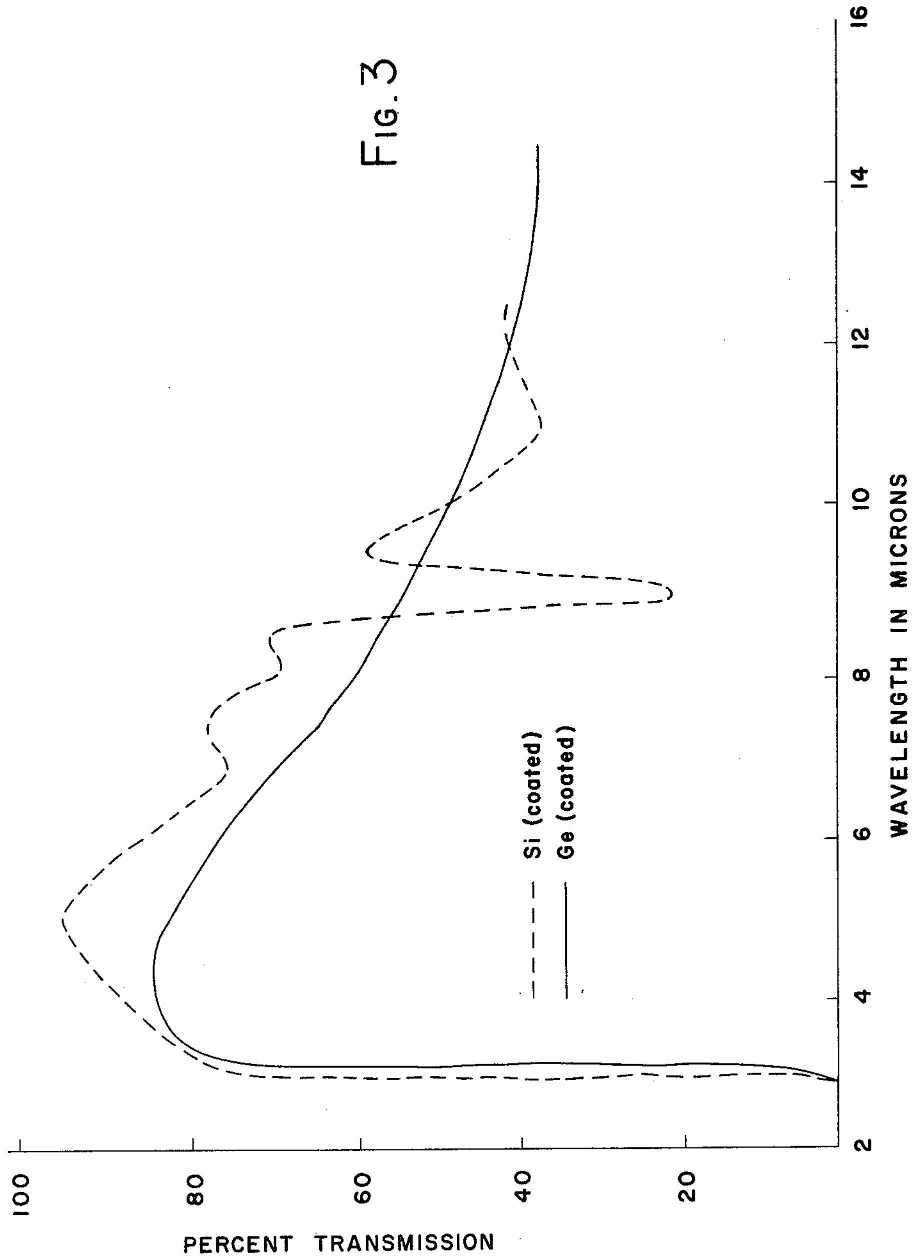
FIGURE 3 is a graph showing percent transmission versus wavelength in microns of coated silicon and coated germanium.
Figure 4:
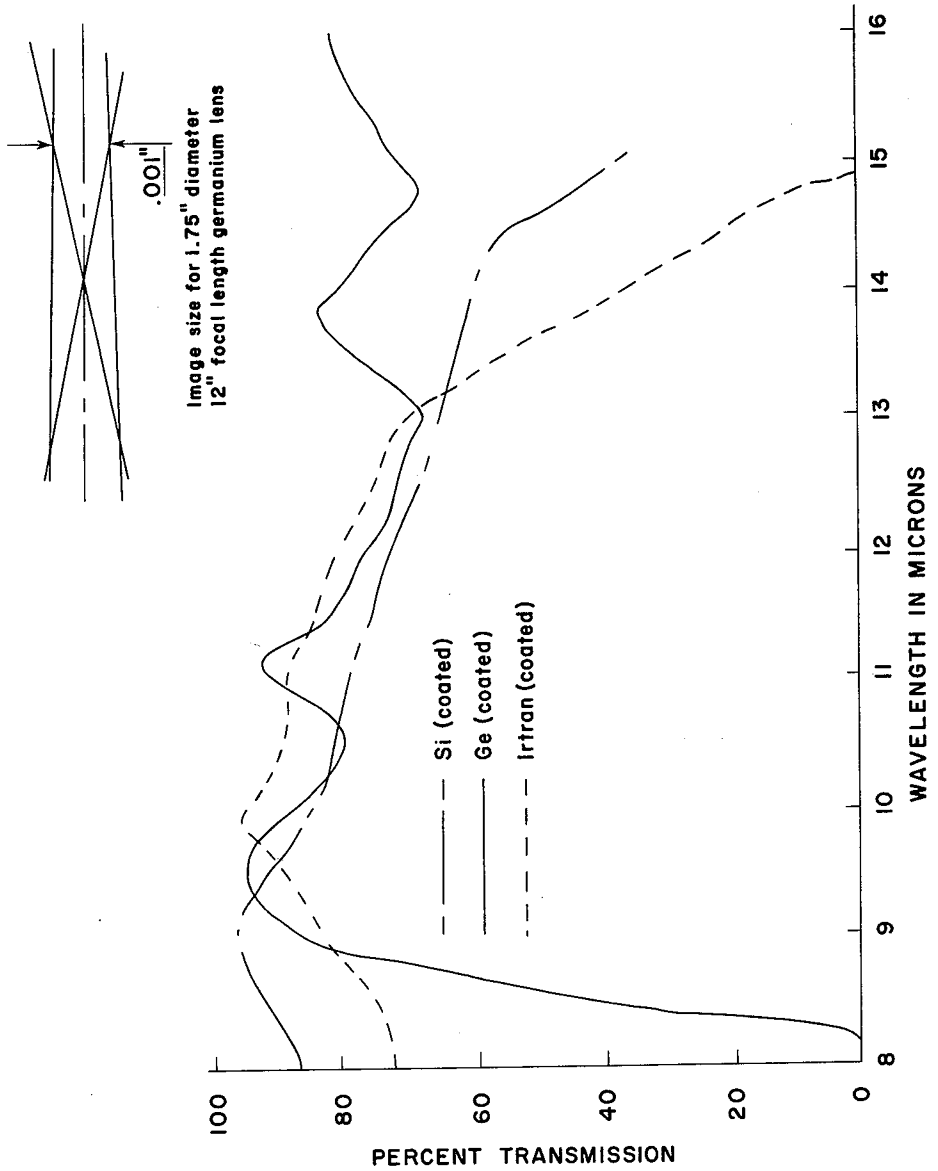
FIGURE 4 is a graph showing percent transmission versus wavelength in microns for coated silicon, germanium and Irtran II.

Refer next to FIGURES 3 and 4. In FIGURE 3, is shown the percent transmission versus wavelength in microns of coated silicon and coated germanium both having a 15 inch focal length with silicon having a .0027 inch image and germanium having a .0063 inch image. From a consideration of FIGURE 3, it can be seen that an average transmission of approximately 90 percent is obtained for silicon from 3.2 to 5 microns and approximately 83 percent for germanium, both anti-reflection coated for heat transmission in these wavelength regions. Image sizes of .0027 inch (0.2 milliradian) for a silicon and .0063 (0.5 milliradian) for germanium are attained in this wavelength region.

FIGURE 4 shows that an average transmission of approximately 85 percent is obtained for germanium and Irtran II and 80 percent for silicon, both anti-reflection coated for peak transmission from 8.5 to 13 microns. The germanium transmission curve further shows the effect of an 8.5 micron cut-on interference type filter which transmits only 0.10 percent of the energy below 8.5 microns. This figure further shows an image size for a 1.75 inch diameter 12 inch focal length germanium objective lens of .001 inch for this wavelength region. This size is contributed primarily by spherical aberration. Chromatic aberration is very small in this wavelength region.

Since the instantaneous field of view required for the optical system is never more than 18.75 milliradians, the objective lens is primarily designed to secure adequate correction for on-axis aberration; i.e., spherical and chromatic.

The on-axis image size due to spherical aberration can be given to a first approximation by the following equation:

$$\delta=\frac{(7.8\times10^{-3})A\lambda}{(f/no)^3} \qquad (3)$$

where:

$\delta$=image size in radians
$f/no$=ratio of the focal length to diameter
$A\lambda$=the number which is an inverse function of the index of refraction of the lens material given constant lens radii Chromatic aberration is a function of the dispersion of the optical material in the wavelength region of interest. From 3.2 to 5 microns, the index of germanium varies by .0027 and silicon varies .0082. From 8.5 to 13 microns, the dispersion is very flat, the index varying by only .005 for germanium in this wavelength region. Thus, germanium was selected for the objective lenses since it has a high index (approximately 4) which thereby satisfies the requirement of Equation 3 and the index changes only .005 in the wavelength region of interest.

Referring again to FIGURE 2. The two objective lenses 12 and 13 which are mounted on the scanning head along with the two associated folding mirrors 14 and 15 rotate to produce the required optical scan. Since only one objective lens is in the detector field of view at any given time, and this objective lens is in the field of view during an entire single scan, the lens offers a negligible contribution to system noise especially since it is made of a material of low emissivity in the effective spectral region. Energy from the two folding mirrors 14 and 15 is directed to the detector assembly by the cold field lens 21 which has low emissivity.

For reasons similar to those developed above with respect to the objective lens 12 and 13, germanium was also chosen as the material for the single element field lens 21. This field lens 21 is designed to image one objective lens at a time onto the detector 1. Thus, since the two objective lenses 12 and 13 rotate about a mechanical axis 19 (FIGURE 2) which is effectively coincident with the optical axis 27 of the field lens 21, it must be made large enough to accommodate this rotation. The field lens 21 can be a single element design since the detector 1 is simply an energy collector. The image which the lens 21 forms on the detector 1 must be merely good enough to spread the arriving signal energy over the surface of the detector 1. The field lens 21 which is cooled to reduce its thermal emission, represents a constant unchanging factor in the detector field of view and, as such, makes no significant contribution to system noise. The lens is coated with a suitable material to produce a short wavelength cutoff at .5 micron to match the atmospheric window 17. This prevents excessive detrimental noise radiation from reaching the detector 1. The front face of the lens 21 is illuminized to form a wedge-shaped aperture 20 as shown in FIGURE 2. The function of this aperture will hereinafter be discussed more fully.

As heretofore mentioned, there are two stops in the optical system which control the effective field viewed by the detector 1. The first of these stops is the instantaneous field stop 8. On the side facing the field of view is a small aperture plate (FIGURE 2) large enough to accommodate the largest instantaneous field of view of the scanner while on the side adjacent the Dewar 3 is a continuously adjustable aperture 7. This plate 7 is made of a highly reflecting material. The adjustable aperture 7 is used to limit the scanner to instantaneous fields of view which are less than maximum. Surrounding the assembly of stops and the Dewar 3 is the highly reflective cylindrical radiation sheild 4 which is also cooled. Thus, the entire unit becomes a cold thermal cavity. The only thermal radiation of any magnitude which can reach the enclosed detector 1 must therefore enter through the instantaneous field stop aperture 8 while all other energy is intercepted and reflected.

Figures 5, 6:
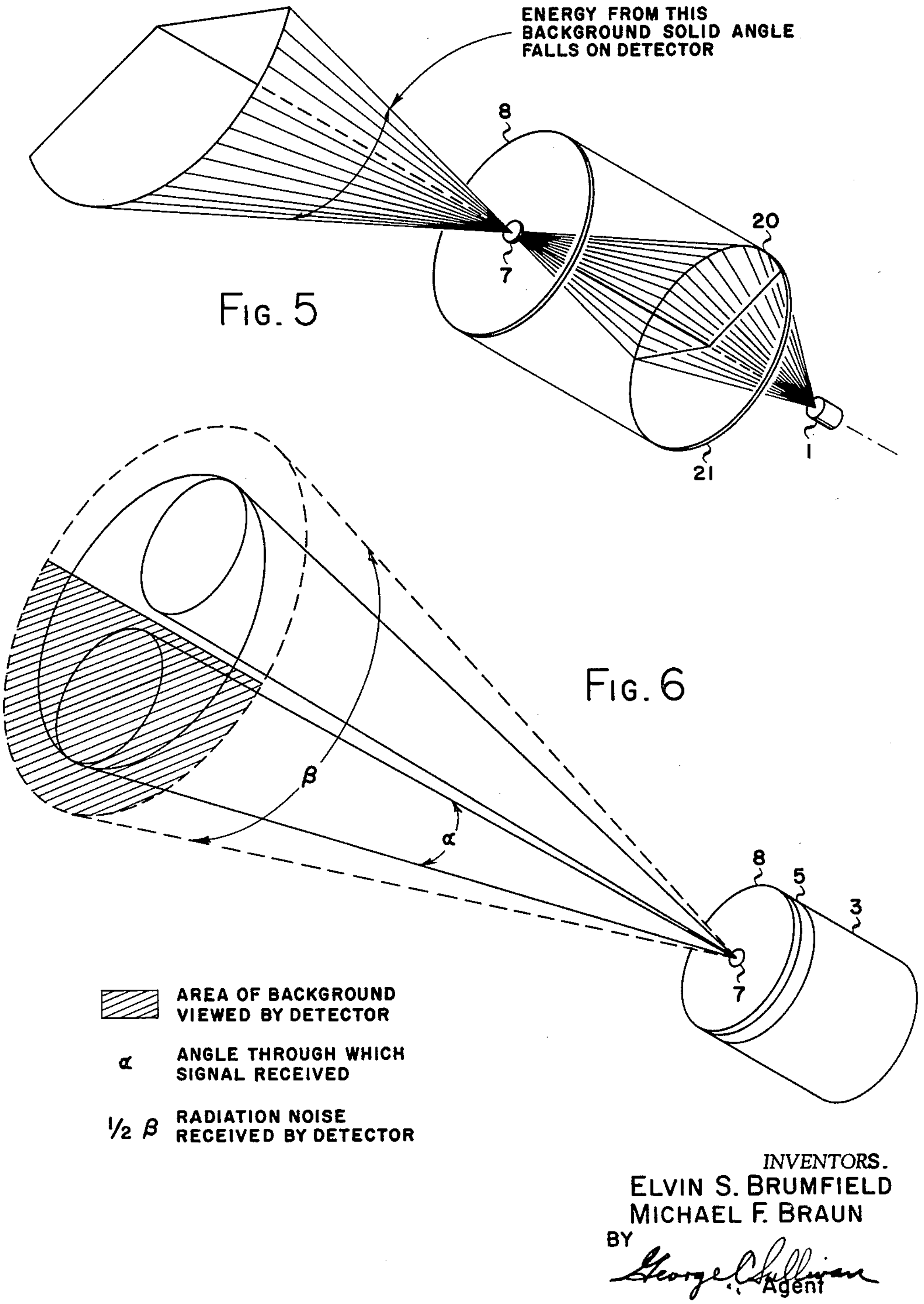
FIGURE 5 is an optical schematic view showing the background shielding of the cold field lens of the subject invention.
FIGURE 6 is an optical schematic showing signal and background radiation angles of the herein described scanning system.

Consider next FIGURE 5. The second stop is the wedge-shaped aperture coated onto the field lens 21. This stop 21 which is also cold, restricts the solid angle which contains all of the significant radiation that can reach the detector 1 to an angle slightly larger than the required angular ground scan of the entire scanning assembly. Thus, the total significant energy striking the detector has been reduced to two components i.e., the effective thermal energy entering a single objective lens (representing the signal), and the thermal energy radiated from the supporting structure around this lens which is contained in the field of view of the partially opaque field lens and detector assembly. The coating on the field lens may be considered as the field stop for the background energy component although it forms a poorly defined exit window.

The result of this poor definition is that the field lens can receive radiation from the somewhat larger solid angle $\alpha$ than shown in FIGURE 6. It should be pointed out that the variable aperture 7 does not limit the scanning angle of the entire reconnaissance system. Rather, this is accomplished by a properly timed blanking of the detector signal.

Coding of all of the above field stops has the effect of greatly reducing the noise input to the associated display system for a background noise limited condition and it provides a significant enhancement of the signal to noise ratio without the need to resort to low relative aperture optical systems.

In the above described manner, there is provided a novel infrared scanning system which employs reflective rather than refractive type optics to thereby reduce the background radiation striking the detector. Additionally, there is provided a novel infrared scanning system which greatly reduces background noise by effectively limiting the field of view of the infrared detector to the solid angle subtended at the detector by the entrance window of the instrument. Additionally, there is provided an infrared scanning system which is ideally suited for operation in the 8.5 to 13 microns range which as heretofore stated has been found to be the optimum operating range of infrared mapping systems such that the self-emission of objects of interest can be detected independent of diurnal variations. Moreover, due to the provision of a background noise limited system, there is provided an infrared scanning system of increased sensitivity which is imperative in infrared mapping techniques.

While there has been described what is at present considered to be a preferred embodiment of the invention, it will be obvious to those skilled in the art that various changes and modifications may be made therein without departing from the invention, and it is claimed in the appended claims to cover all such changes and modifications as fall within the true spirit and scope of the invention.

What is claimed is:

1. An infrared detector system comprising: rotatable optical scan means, means for driving said rotatable optical scan means, field stop means having an aperture therein in optical association with said rotatable optical scan means, detector housing means comprising a Dewar flask having an entrance window in optical association with said rotatable optical scan means, cold shield means within said detector housing means having an opening therethrough in optical association with both said rotatable optical scan means and said aperture of said field stop means, cold field stop means within said detector housing means in optical association with said rotatable optical scan means, said aperture of said field stop means and said opening of said cold shield means, a detector shielded by said shield means in optical association with said cold field stop means, and means for cooling said cold shield means, said cold field stop means and said detector, whereby radiant energy within the field of view of said rotatable optical scan means is folded thereby through the aperture of said field stop means, through said opening of said cold shield means and through said cold field stop means onto said detector.

2. The apparatus of claim 1 in which said rotatable optical scan means comprises at least one rotatably mounted objective lens in scanning association with the area of interest and one folding mirror in optical association with each objective lens.

3. The apparatus of claim 1 wherein the aperture of said field stop means is variable responsive to a velocity over height computer which is receptive of aircraft velocity and height signals.

4. The apparatus of claim 2 wherein the aperture of said field stop means is variable responsive to a velocity over height computer which is receptive of aircraft velocity and height signals.

5. The apparatus of claim 4 wherein said objective lenses are made of germanium, said cold field stop means is made of germanium and said detector is of the mercury-doped germanium type.

6. The apparatus of claim 5 wherein said cold field stop means has a wedge-shaped aperture coated to produce a short wave length cutoff at substantially 8.5 microns.

7. A system for periodically scanning an area of interest to provide an electrical signal indicative of infrared radiation detected comprising: a refractive optical system comprising at least one rotatably mounted objective lens in optical association with said area of interest and one rotatably mounted folding mirror in optical association with each of said objective lenses, means for driving said rotatably mounted objective lenses and folding mirrors, field stop means having an aperture thereon positioned along the optical axis of said folding mirrors, an infrared cell which generates an electrical signal of a magnitude substantially proportional to the amount of infrared radiation falling upon it, cold shield means surrounding said infrared cell, and a cold field stop means positioned between said field stop means and said infrared cell whereby radiant energy received by said objective lenses if folded by said folding mirrors through the aperture of said field stop means onto said cold field stop means and distributed thereby onto said infrared cell.

8. The apparatus of claim 7 wherein said objective lenses are made of germanium, said cold field stop means is made of germanium and said detector is of the mercury-doped germanium type.

9. A system for periodically scanning an area of interest to provide an electrical signal indicative of infrared radiation detected comprising: at least one rotatably mounted objective lens in optical association with the area of interest, a rotatably mounted folded mirror in optical association with each objective lens, means for rotating said objective lenses and said folding mirrors, a variable aperture field stop means having its variable aperture located along the optical axis of said folding mirrors, the size of the variable aperture of said variable aperture field stop means being controlled by a velocity over height computer receptive of aircraft velocity and height signals whereby the instantaneous field of view provided by said objective lenses is varied in accordance with aircraft velocity and height, an infrared cell which generates an electrical signal responsive to infrared radiation falling upon it, cold shield means shielding said infrared cell, and cold field stop means positioned between said field stop means and said infrared cell whereby radiant energy received by said objective lenses is folded thereby through the variable aperture of said field stop means onto said cold field stop means and distributed thereby onto said infrared cell.

10. The apparatus of claim 8 wherein said cold field stop means has a wedge-shape aperture coated to have a short wave length cutoff at 8.5 microns.

11. The apparatus of claim 9 wherein said field lens is made of germanium, said cold field stop means is made of germanium, and said detector is of the mercury-doped germanium type.

References Cited in the file of this patent

UNITED STATES PATENTS

| | | |
|---|---|---|
| 2,723,589 | Bullock et al. | Nov. 15, 1955 |
| 2,747,455 | Spracklen et al. | May 29, 1956 |
| 2,984,747 | Walker | May 16, 1961 |
| 2,997,539 | Blackstone | Aug. 22, 1961 |